T. MIDGLEY.
MACHINE FOR CUTTING AND ROLLING FABRIC.
APPLICATION FILED NOV. 14, 1913.
1,321,228.
Patented Nov. 11, 1919.
9 SHEETS—SHEET 7.
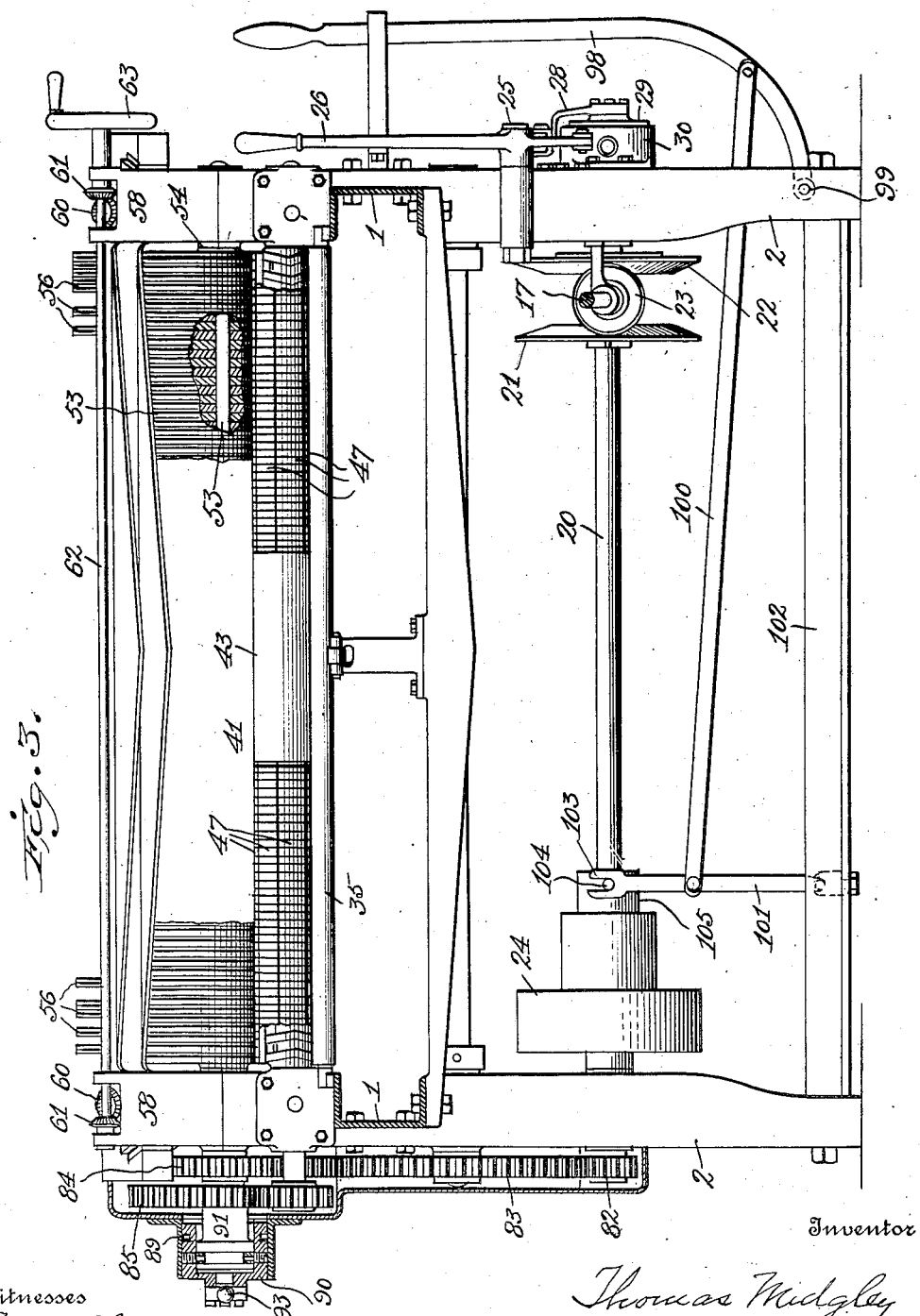

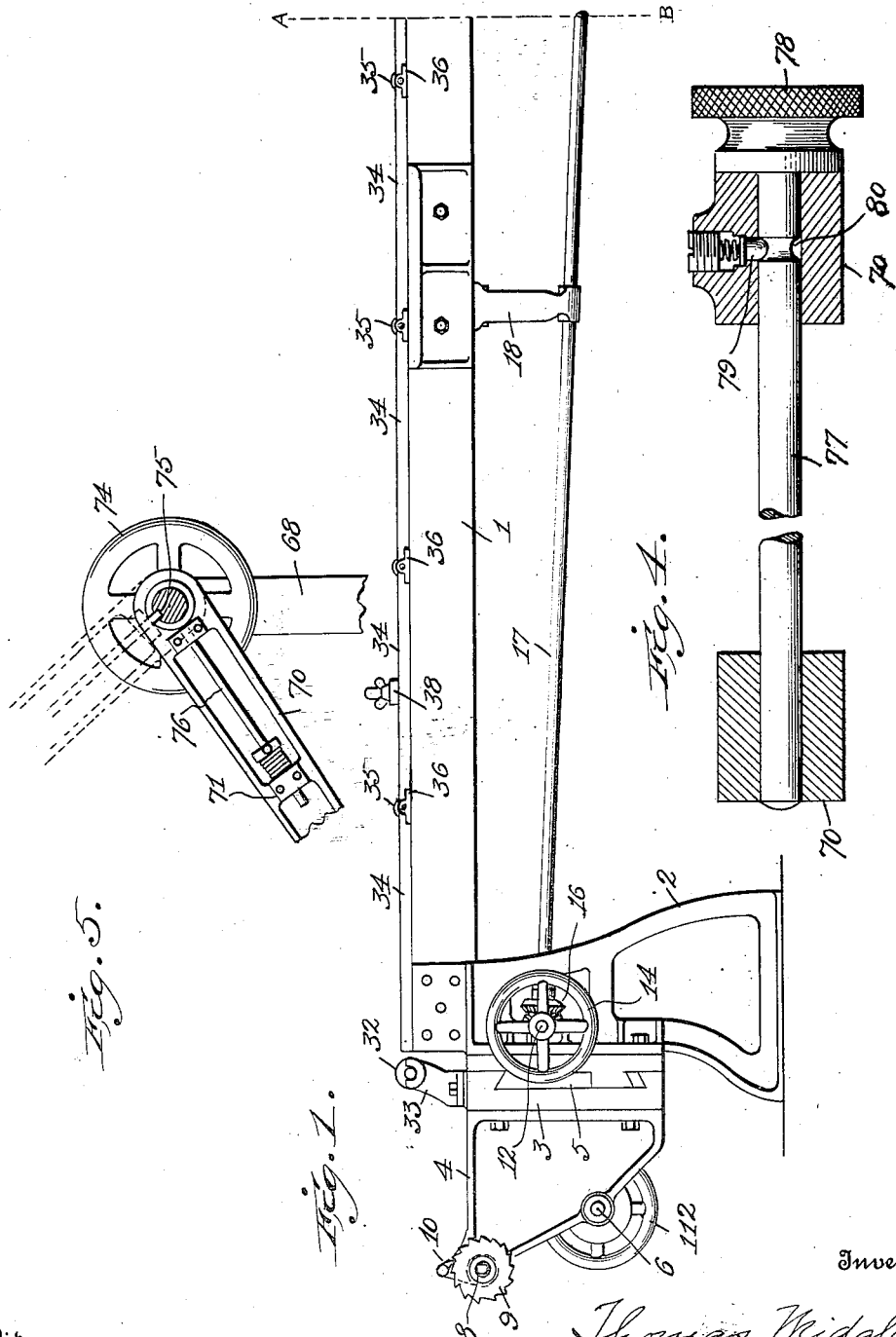

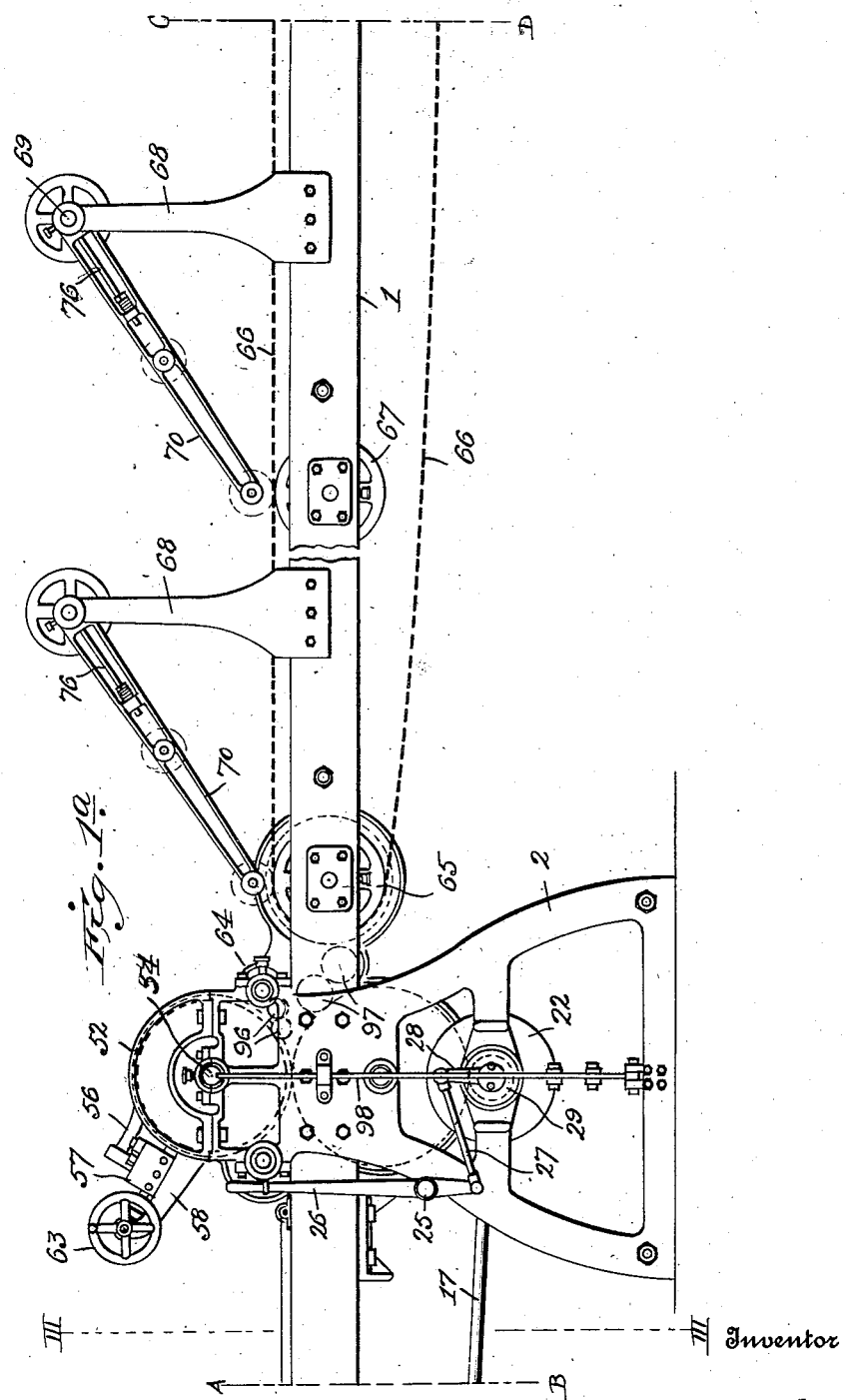

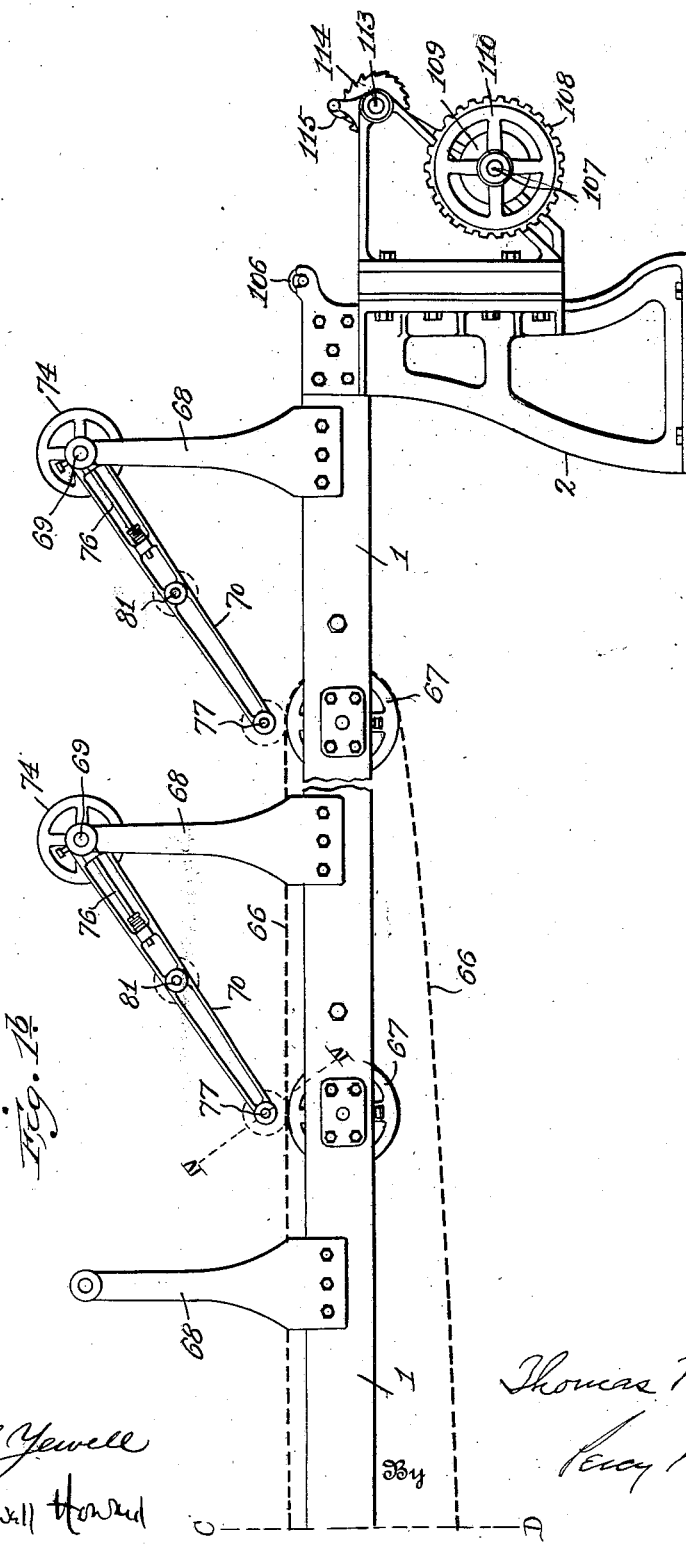

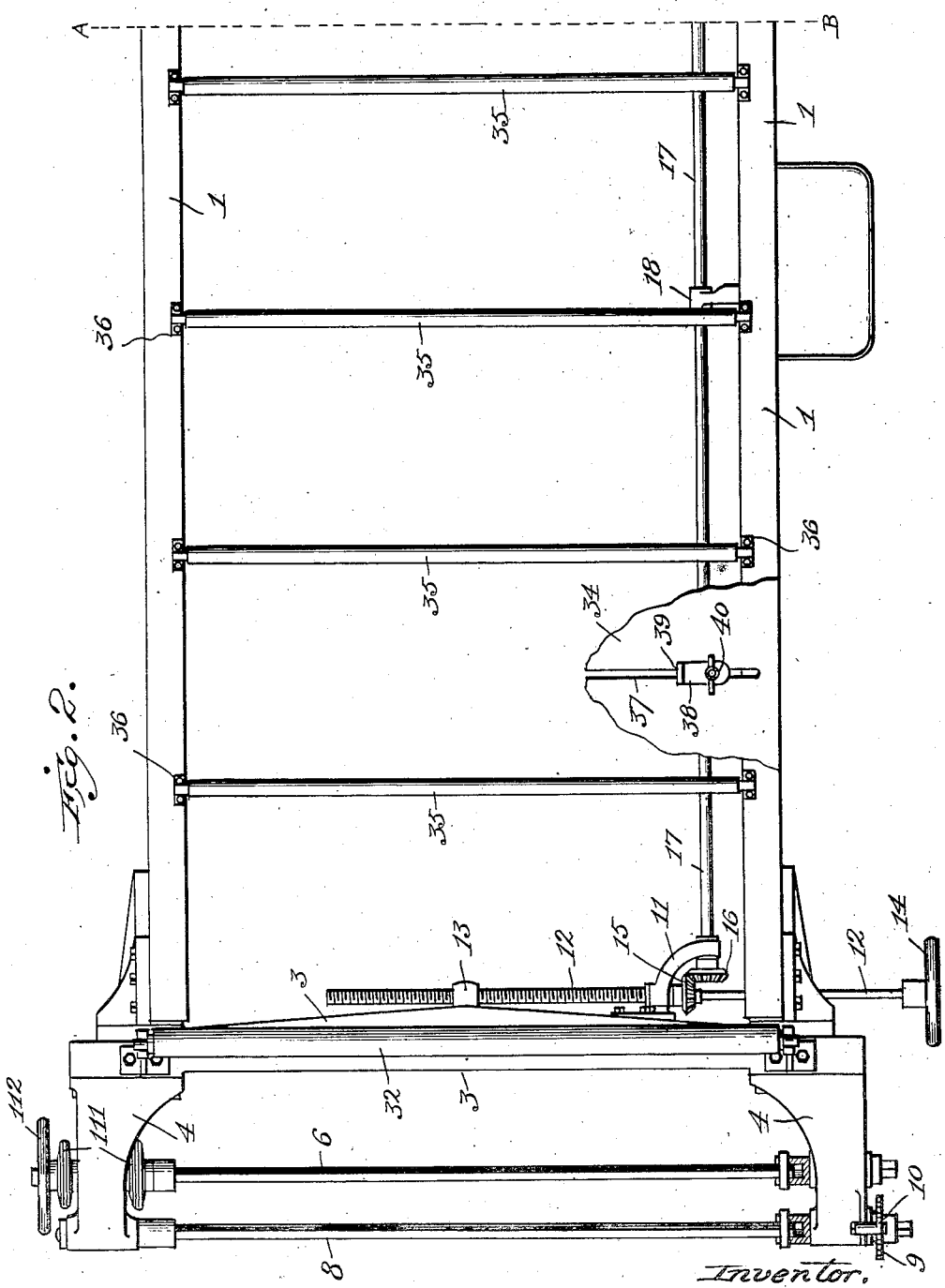

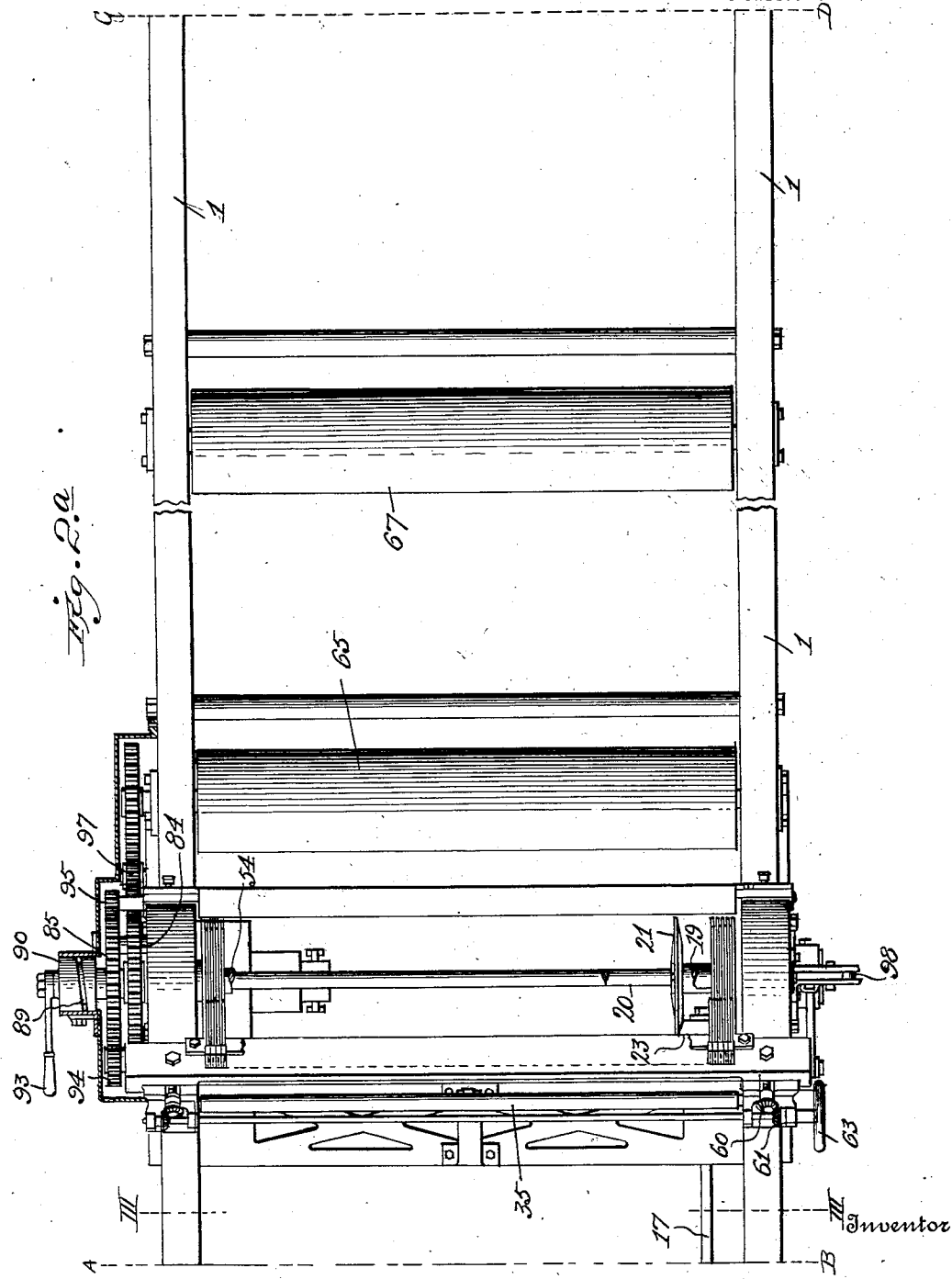

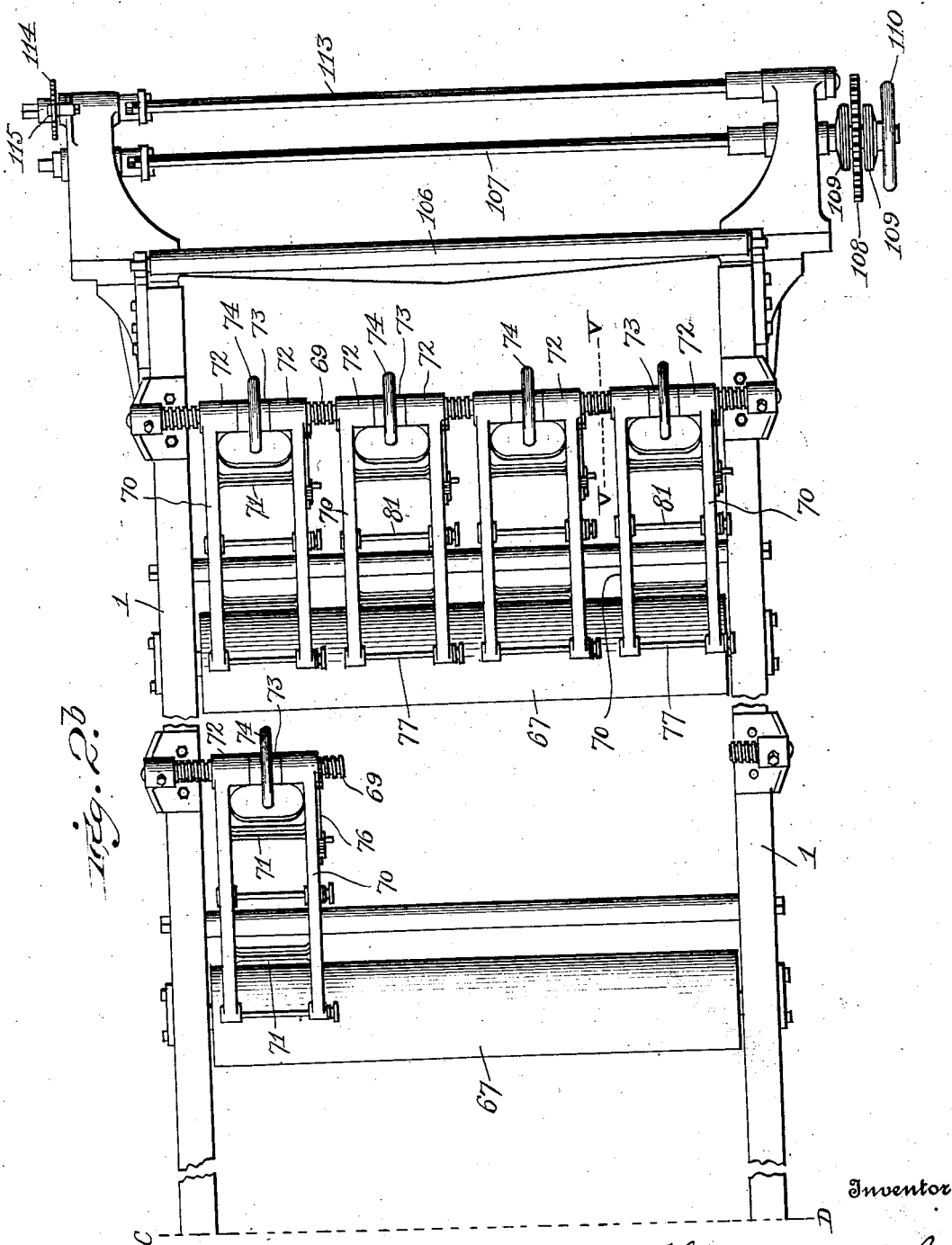

T. MIDGLEY.
MACHINE FOR CUTTING AND ROLLING FABRIC.
APPLICATION FILED NOV. 14, 1913.
1,321,228.
Patented Nov. 11, 1919.
9 SHEETS—SHEET 8.
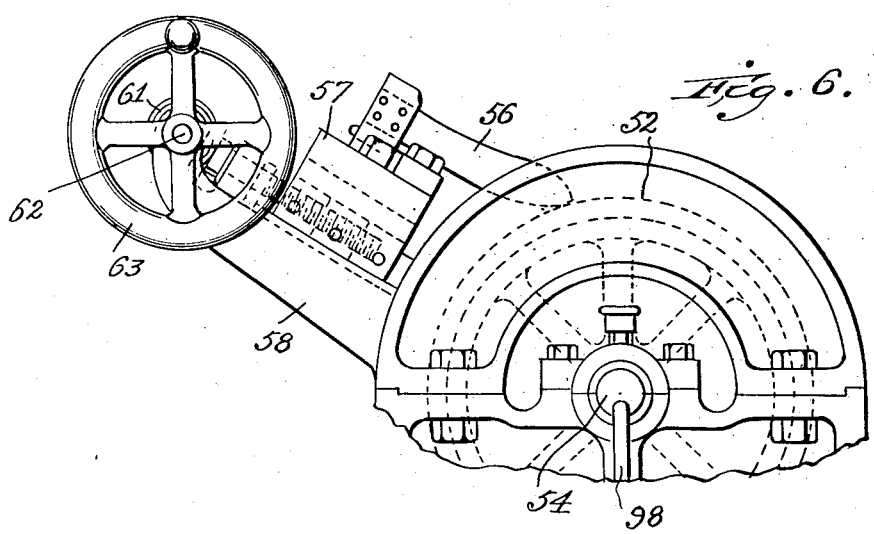
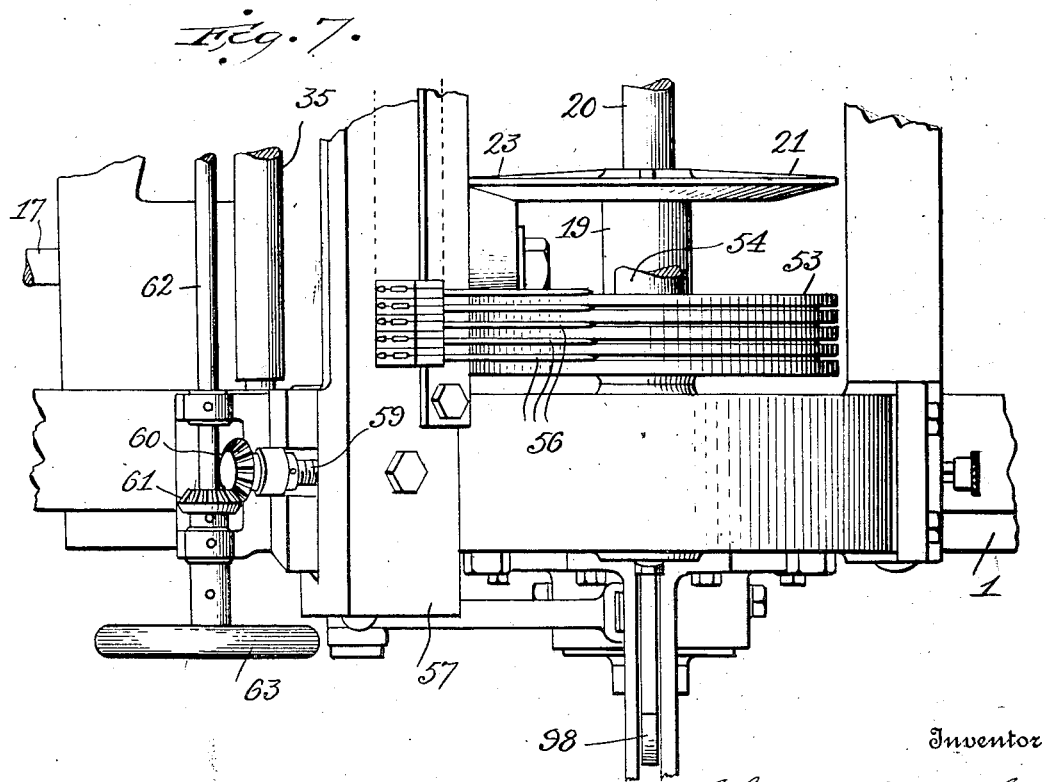
Witnesses
Edwin L. Yewell
Charles Lowry Howard
Inventor
Thomas Midgley
By Percy B Hills
Attorney

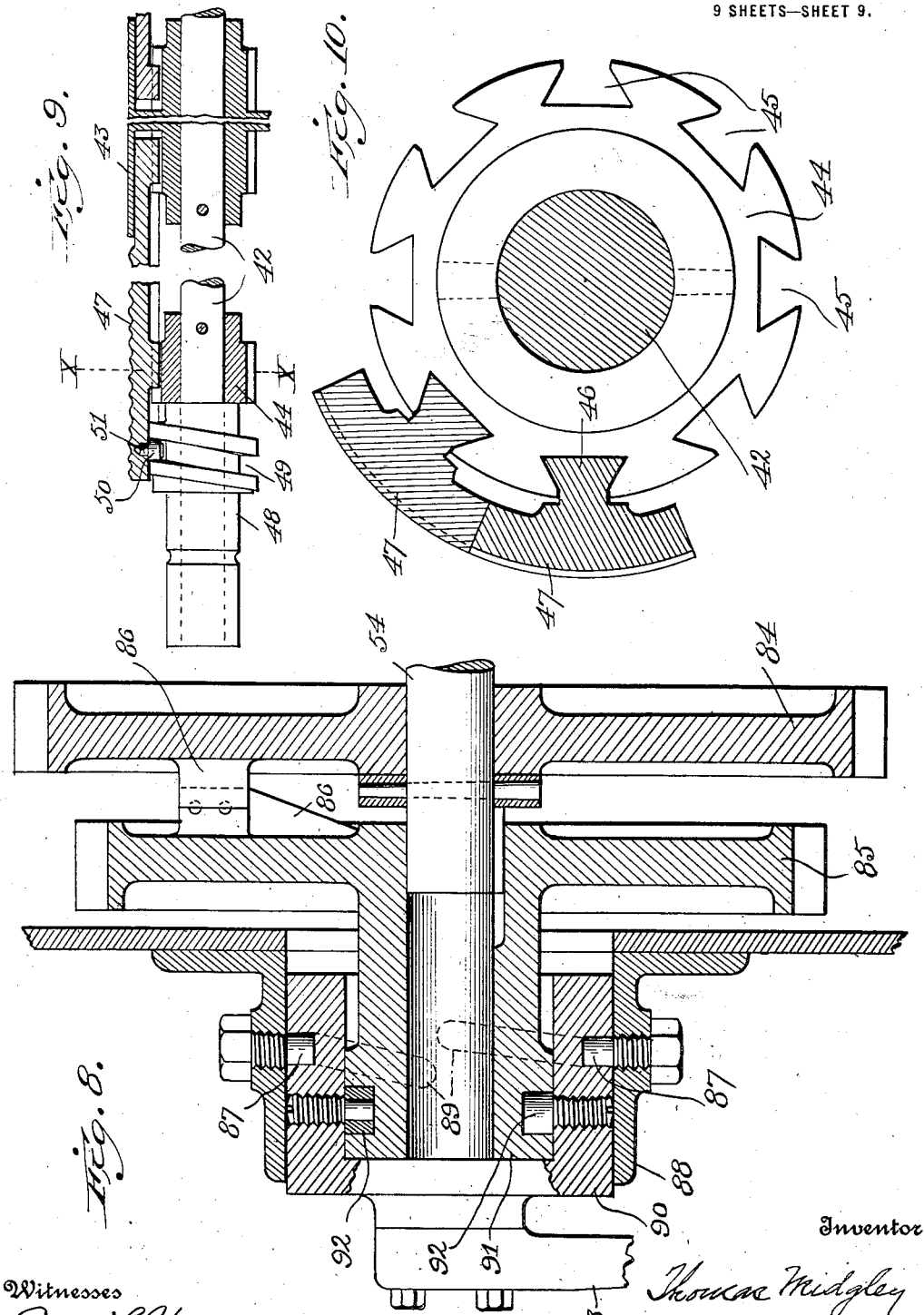

UNITED STATES PATENT OFFICE.

THOMAS MIDGLEY, OF WORTHINGTON, OHIO, ASSIGNOR TO MORGAN & WRIGHT, OF DETROIT, MICHIGAN, A CORPORATION OF MICHIGAN.

MACHINE FOR CUTTING AND ROLLING FABRIC.

1,321,228.        Specification of Letters Patent.    Patented Nov. 11, 1919.

Application filed November 14, 1913.   Serial No. 601,016.

*To all whom it may concern:*

Be it known that I, THOMAS MIDGLEY, a citizen of the United States, residing at Worthington, in the county of Franklin, State of Ohio, have invented new and useful Improvements in Machines for Cutting and Rolling Fabric, of which the following is a specification.

My invention relates to machines for cutting and rolling fabric, and is designed particularly for use in connection with webs of fabric which have been coated or impregnated with rubber and known commonly as " frictioned fabric "; the particular object of my improved machine being to cut webs of such frictioned fabric into strips suitable for use as breaker strips used in the manufacture of tire shoes, and, if desired, to wind said strips so cut either separately upon spools or together upon a common spool.

My improved machine so designed embodies numerous improved details of construction, as will be hereinafter more particularly described and claimed, reference being had to the accompanying drawings, in which:

Figures 1, 1ª and 1ᵇ, taken together, illustrate a side elevation of my improved machine.

Figs. 2, 2ª and 2ᵇ, taken together, illustrate a top plan view of the same.

Fig. 3 is a vertical transverse sectional view taken on the line III—III, Fig. 2ª.

Fig. 4 is an enlarged detail sectional view on the line IV—IV, Fig. 1ᵇ, illustrating one of the spool shafts and the means for locking the same in position against any but a positive displacement.

Fig. 5 is an enlarged detail sectional view taken on the line V—V, Fig. 2ᵇ.

Fig. 6 is an enlarged detail side elevation of the support for the cutting knives, together with a portion of the cutting cylinder.

Fig. 7 is an enlarged fragmentary top plan view of the same.

Fig. 8 is an enlarged detail sectional view of part of the drive gear of the machine, showing the mechanism for throwing a part of the machine into and out of gear.

Fig. 9 is an enlarged detail longitudinal sectional view of a portion of the fabric spreading roller.

Fig. 10 is a still further enlarged transverse sectional view taken on the line X—X, Fig. 9.

Similar numerals of reference denote corresponding parts in the several views.

The frame of my improved machine consists of the angle iron side bars 1 extending the length of the machine and suitably supported upon legs 2. The said machine may be described as embodying three parts, as follows: the feeding mechanism, illustrated in Figs. 1 and 2; the cutting mechanism, illustrated in Figs. 1ª, 2ª, 6 and 7; and the winding mechanism for the cut strips, illustrated in Figs. 1ᵇ, 2ᵇ, 4 and 5.

Referring first to the feeding mechanism, there is mounted at the feed end of the machine a transverse carrier frame 3, having end brackets 4 bolted thereto, said carrier frame being mounted to move transversely on a guide 5 formed on the end of the machine frame. Removably mounted in the brackets 4 is a lower squared spool receiving shaft 6, and above the same is also mounted another squared spool receiving shaft 8, the same having fixed to one end a ratchet wheel 9 in which plays a pawl 10 carried by one of the brackets 4. The lower shaft 6 is for the purpose of receiving a spool containing a web of frictioned fabric to be cut into breaker strips, which web is rolled on its spool with an interposed layer of unfrictioned fabric to prevent said frictioned fabric from sticking to itself while wound. Mounted to rotate in a bracket 11 bolted to the machine frame is a transverse screw shaft 12, having its screw threaded inner end passing through and in screw threaded enagagement with a lug 13 mounted on the carrier frame 3, whereby rotation of said shaft 12 will shift said carrier frame 3 transversely on its guide 5 in either direction. Said shaft 12 is provided with a hand wheel 14 at its outer end to provide for rotating said shaft at that point, and is provided also with a bevel gear 15 intermediate its length, with which meshes, at a right angle thereto, a similar bevel gear 16 mounted on the end of a shaft 17 disposed longitudinally of the machine and rotatable in suitable brackets 18 carried by the machine frame. Said shaft 17 terminates at its other end intermediate the length of the machine frame and beneath the cutting mechanism, hereinafter to be described, as seen in Figs. 1ª 2ª and 3.

Mounted upon a sleeve 19 splined to a transverse shaft 20 disposed beneath the cutting mechanism are two oppositely faced beveled friction disks 21 and 22 adapted alternately to contact with a smaller beveled friction cone 23 mounted on the inner end of the shaft 17. Said shaft 20 constitutes the drive shaft of the machine, the power being applied thereto from any suitable source through a drive pulley 24 thereon in the following manner: Pivoted at 25 intermediate its length to the machine frame is a hand lever 26, from the lower end of which a connecting link 27 runs to a lever 28 that is fixed to a sleeve 29 rotatably disposed in a projection 30 of the machine frame. In a detailed description hereinafter of the mechanism for connecting and disconnecting the cutting roll from the drive is set forth the details of construction and operation of the parts operated by a handle 93 whereby a splined gear 85 is shifted longitudinally of its shaft; and the mechanism between the sleeves 19 and 29 is identical in construction and operation with that mechanism, whereby the sleeve 19 and the beveled friction disks 21 and 22 carried thereby may be shifted by the lever 26 longitudinally of the shaft 20 so that either of said bevel disks may be brought into contact with beveled cone 23 or they may be made to assume a neutral position with both of them out of contact therewith.

In operation a web of frictioned fabric to be cut is mounted in a roll upon the shaft 6, said web having rolled therewith a web of unfrictioned fabric to prevent sticking. The ends of the two webs are carried around shaft 8 where the web of unfrictioned material is engaged with said shaft 8 so as to wind thereon, said shaft being rotated by the movement of the frictioned web. The frictioned fabric is then drawn over a transverse guide roll 32, mounted in brackets 33 carried by the carrier frame 3, and longitudinally of the machine over a table formed by boards 34, between the slightly separated edges of which are disposed transverse idler rollers 35 mounted to rotate freely in bearings 36 fixed to the side bars 1. The web of frictioned fabric thus is carried to the rolls or drums of the cutting mechanism, hereinafter to be described, by which it is drawn along to be cut. Owing to irregular winding into rolls of the webs of frictioned fabric, the same, when drawn into the cutting mechanism, will pass along the table formed by the boards in an irregular manner, shifting from side to side, which irregular feed is overcome in the following manner: Mounted in a transverse slot 37 formed in one of the boards 34 is a guide 38, the same having an inner vertical guide face 39, and being adjustably maintained in position by means of a set-screw 40. Now, when the web of frictioned fabric is passed along the table to the cutting rollers or drums this guide 38 is set to coincide with the edge of the web, and the operator by manipulating the lever 26 can maintain the edge of the web in alinement with said guide 38 in the following manner: Should said web during its feed begin to shift away from said guide 38, a movement of the lever 26 will, through connecting link 27 and lever 28, rotate and shift the sleeve 29 longitudinally of the shaft 20, and will correspondingly shift the sleeve 19 carrying beveled friction disks 21 and 22, which will bring one of said beveled disks 21 or 22 into contact with beveled cone 23 and thus transmit the rotary motion of said shaft 20 to shaft 17 in one direction. This results in a similar transmission of rotary motion from shaft 17 to shaft 12, through bevel gears 15 and 16, and a consequent bodily transverse shift of the carrier frame 3, which carries with it the web of fabric on shaft 6. By thus shifting the web of fabric bodily the edge thereof can be brought and maintained in proper alinement with guide 38, for it will be seen that a shift of the lever 26 in the opposite direction will cause the other of the disks 21 or 22 to contact with cone 23, and thus cause a reversal of rotation of shafts 17 and 12 and a consequent bodily transverse movement of the web of fabric in the opposite direction. It will be understood that the disks 21 and 22 are so disposed with respect to cone 23 that there will be an intermediate point in the position of the lever 26 when neither of the disks 21 or 22 will be in mesh with gear 23, so that when the fabric is running true no shifting of the same will take place. This maintenance of the fabric in alinement is important, in order that the same, when cut into strips, will follow the weave of the fabric and will minimize waste by cutting the strip nearest the guide 38 of equal width with the other strips.

The web of frictioned fabric in feeding has a tendency to stick to the interposed web of unfrictioned fabric that is wound on the shaft 8, and this occurs to such an extent that the unfrictioned fabric would be drawn off of shaft 8 and onto the table, the unfrictioned fabric unwinding from shaft 8. This I overcome effectually by means of the pawl 10 and ratchet 9, which prevent reverse rotation of shaft 8 and thus cause the two webs to separate.

Referring now to the mechanism for cutting the web of frictioned fabric into strips, suitable for use as breaker strips and for other purposes, the numeral 41 denotes a transverse positively driven roller which acts not only as a guide roller, but also as a spreading or smoothing roller for the web of fabric to be cut. To accomplish this spreading or smoothing action on the web of fabric said roller comprises a central shaft 42 having fixed at or formed integral with its central portion a smooth sleeve 43, and having fixed thereto upon opposite sides of said central portion two sets of sleeves 44 formed on their exterior surfaces with longitudinally disposed dovetailed grooves 45, in which are adapted to slide the dovetails 46 formed on the segments 47, which latter, preferably four in number on each side of central sleeve 43, constitute a surface for the roller flush with the smooth central section 43, as best seen in Figs. 3, 9 and 10. Mounted freely on the shaft 42 near each end, but fixed to the machine frame against rotation, is a sleeve 48 having formed therein a cam groove 49 in which engage rollers 50 carried by studs 51, there being one such roller and stud for each segment 47, whereby rotation of shaft 42, which carries with it the said segments 47, causes a reciprocation of said segments longitudinally with respect to said shaft. Said segments 47 are corrugated transversely on their outer faces to provide a roughened surface, and, as the sheet of fabric is in contact therewith only about half way around the roller as a whole, by initially adjusting the cam grooves 49 so that each segment 47 is made to slide outwardly while the fabric is in contact therewith, the action on the fabric will be a stretching or smoothing one, as will be understood. I provide the intermediate smooth section 43 for the roller for the reason that it has been found to be unnecessary to provide a greater reciprocating surface than that provided as in Fig. 3.

Mounted in immediate proximity to, but to the rear of, the roller 41 is the positively driven cutter roll 52, the same being formed of a series of plates or disks 53 disposed on a central shaft 54 and bolted together thereon by a plurality of rods 55, preferably four in number. The plates or disks 53 are spaced apart, as best seen in Fig. 7, so that, when assembled on the shaft 54, they provide grooves therebetween for the reception of the cutter blades 56. Said cutter blades are removably disposed in slots in a transverse carrier 57 slidably mounted upon brackets 58 projecting from the machine frame, said carrier being capable of adjustment toward and from the cutter roll 52 by means of screws 59 actuated through the bevel gears 60 and 61 by the transverse shaft 62, the latter being provided with a hand wheel 63. On the discharge side of the cutter roll 52 is a positively driven guide roller 64, beneath which the cut fabric passes on its way to the spooling mechanism hereinafter described.

The machine frame extends to the rear of the cutting mechanism, and has journaled therein a transverse roller 65 positively driven, as hereinafter described, around which passes an endless flexible carrier 66, shown in dotted lines in Figs. 1$^a$ and 1$^b$, said carrier being formed preferably of a series of transverse wooden slats. Disposed along the machine frame are other transverse idler rollers 67 over which said endless carrier travels and around the end one of which it passes on its way back to the driving roller 65. Fixed to the sides of the machine frame 1 at intervals is a series of vertical supports 68, in the upper ends of each pair of which is fixed a transverse screw threaded shaft 69. Each of said shafts has mounted thereon a series of spooling brackets composed of parallel members 70 connected by transverse braces 71, the hubs 72 thereof being freely slidable on their shafts 69, and embracing between them threaded sleeves 73 in engagement with the threads on the shafts 69, said sleeves being formed with hand wheels 74 for rotating the same, and which operate to adjust said spooling brackets longitudinally of their shafts 69 and laterally of the machine frame. As best seen in Fig. 5, each of said shafts 69 has formed therein a longitudinal slot 75, in which is adapted to engage a spring pressed bolt 76 carried by the spooling bracket when said bracket is rotated bodily on its shaft 69 to the position shown in dotted lines in said Fig. 5, whereby, when desired, the spooling bracket may be thrown upward and retained out of operative position. At their lower ends said spooling brackets carry removable spool shafts 77, shown in detail in Fig. 4, said shafts being headed at one end at 78 and being retained in position in said spooling brackets by means of spring pressed studs 79 engaging in grooves 80 formed in said shafts 77, said retaining means operating against any but a positive displacement. Similar shafts 81, similarly retained against any but a positive displacement, are mounted in said spooling brackets above said shafts 77.

The machine is driven in the following manner: The power driven shaft 20 carries at one end a gear 82 in mesh with a larger idler gear 83, which in turn is in mesh with a gear 84 mounted free on the shaft 54 of the cutting roll 52. Splined to said shaft 54 so as to have a limited longitudinal movement thereon is a gear 85, the adjacent faces of said gears 84 and 85 being provided with dogs 86 that engage to cause the two gears to rotate together when gear 85 is shifted toward gear 84. This detail is best seen in Fig. 8, where the parts are shown shifted substantially half way into engagement. The shifting means consists of two studs 87 fixed in a projection 88 of the machine frame, said studs being disposed in cam grooves 89, each extending half way around the outer surface of a sleeve 90 mounted freely on the extended hub 91 of gear 85. While said hub 91 is free to rotate in sleeve 90, it is moved longitudinally by any such movement of said sleeve 90 through rollers 92 carried by said sleeve 90 and running in an annular groove formed in said hub 91. Fixed to the sleeve 90 is an operating handle 93, a half turn of which similarly rotates sleeve 90, causing the same to move longitudinally, due to the cam grooves 89 and studs 87, and carrying with it hub 91 and gear 85, thus shifting the dogs 86 into or out of engagement and thereby controlling the rotation of shaft 54 and the cutting roll 52 thereon. The shaft 42 of spreading roller 41 is driven directly from gear wheel 85 through gear 94 on shaft 42, meshing therewith, so that the cutting roll 52 and the spreading roller 41 are rotated or stopped in unison, and the same is true of roller 64, the shaft of which carries gear 95 in gear with gear wheel 85 through two intermediate gears 96, shown in dotted lines in Fig. 1ª. On the other hand, the drive roller 65 for the endless flexible carrier 66 is driven from gear wheel 83, through intermediate gears 97, also shown in dotted lines in Fig. 1ª, so that said endless carrier 66 may continue to be driven when the cutting roll 52 and its parts are disconnected from the drive through operating handle 93 and its controlled parts.

To control the application of power to the machine as a whole I provide a lever 98 pivoted at 99 to the machine frame, to which is connected a rod 100 that in turn is connected to an arm 101 pivoted at its lower end on a crossbar 102 of the machine frame, and at its upper bifurcated end 103 engaging a pin 104 fixed to a clutch member 105 of any suitable construction, the latter operating to engage or disengage the shaft 20 and the drive pulley 24.

The operation of the machine as a whole may be described as follows: The web of frictional fabric to be cut is mounted on the shaft 6 and is carried around shaft 8 and over the rollers 35 in the table formed by the boards 34 to the spreading roller 41, its position laterally being controlled by the lever 26 and its mechanism hereinbefore described. In its passage partly around the roller 41 said web of fabric is spread or smoothed out laterally, as hereinbefore described, and then passes onto the cutting roll 52, by which it is carried past the cutter blades 56, which, having been spaced apart in their carrier 57 properly to cut said fabric web into strips of the desired width, duly perform their function, and the material so cut into strips passes on around the roll 52 until it reaches the guide roller 64, by which it is guided onto the endless belt 66. A number of the spooling brackets equal to the number of strips into which the fabric web has been cut having been positioned with their lower spool shafts 77 carrying spools resting on the endless belt 66, said spools will be rotated by the movement of the endless belt 66 and each spool will take up the strip of fabric with which it is in alinement. And, in order to prevent the convolutions of the strips of fabric when thus rolled on their spools from sticking to each other, I mount upon each of the upper shafts 81 a web of unfrictioned fabric or other material, which is carried down to wind between the convolutions of the strip as it winds on its spool. It will be observed by reference to Fig. 1ª that the lower end of each of the spooling brackets rests upon the roller 65 or upon one of the rollers 67, so that an unyielding surface is presented which, in conjunction with the moving endless belt 66, will provide a frictional contact sufficient to wind the strips of fabric, together with the strips of unfrictioned material upon their spools without the necessity of positively driving said spools.

When a roll of fabric on the shaft 6 becomes exhausted, and its end runs onto the table at that end of the machine, the machine is stopped by manipulating lever 98 and clutch 105, and a fresh roll of fabric is mounted on shaft 6, its end being carried around shaft 8 and onto the table, where it is temporarily joined to the end of the preceding fabric roll by overlapping, the rubber forming the frictioning element therein being sticky enough to cause the two to adhere. The machine is again started and run until the joined ends pass through the cutting mechanism and onto the end of the endless belt 66, when the machine is again stopped, and the ends of the strips of cut fabric are disengaged from each other. By now giving the operating handle 93 a half turn the gear wheel 85 will be thrown out of clutch with gear wheel 84, which disengages the cutting mechanism from the drive, as hereinbefore described, but which still drives the roller 65 and the endless belt 66. By now again starting the drive of shaft 20 the endless belt will be driven, while the cutting roll and its connected parts are still, which results in the completion of the wind of the strips of the first roll of fabric, while the advance ends of the following strips remain still. When said strips are all wound on their spools the machine is again stopped, said spools and their rolls of fabric removed, and by returning the handle 93 to its initial position and starting the machine the cut strips of the following web of fabric may be wound on fresh spools placed on the shafts 77.

While I contemplate mounting upon each transverse screw shaft 69 a plurality of spooling brackets, the number of which is governed only by the width of the machine, still in practice I prefer to use a portion only of said brackets on each shaft in rolling up the strips from a given web of fabric. By this means, and because of the lateral adjustment provided for said brackets, each of the latter can be adjusted accurately to take up its assigned strip of fabric centrally on its spool, and that, too, without regard to the width of said strip.

It is desired sometimes to roll up the strips of cut fabric together on a single spool, in which event all the spooling brackets are turned up and automatically retained out of action, and the strips of fabric carried off the discharge end of endless belt 66 and over the idler roller 106 down to a spool mounted on a transverse squared shaft 107. Said shaft may be driven by means of power applied through sprocket wheel 108, in which event a friction speed regulating device 109 is interposed having a regulating haid wheel 110, permitting said shaft 107 to slip, which is necessary because of the fact that the speed of rotation of the same must vary in proportion to the bulk of material wound on said shaft, it being evident that as the size of the roll thereon increases its speed should diminish. And I have provided a similar friction device 111 and regulating hand wheel 112 for the shaft 6 at the feed end of the machine to control the speed of rotation of said shaft and the fabric-web-carrying spool thereon.

It being necessary to provide against the sticking of the convolutions of the fabric strips to each other, when wound on the spool on shaft 107, just as when wound on the spools on shafts 77, I provide a shaft 113 controlled against reverse rotation by a ratchet wheel 114 and pawl 115, upon which is to be mounted, a web of fabric or other suitable material, which is to be wound up with the strips of frictioned fabric on the spool on shaft 107.

Having thus described my invention, what I claim as new and desire to secure by Letters Patent is:

1. In a machine of the class described in combination means for feeding a web of fabric, and mechanism for bodily shifting said fabric from side to side including a manually-operable control adapted to automatically prevent the connection of the mechanism for shifting in one direction while shifting in the opposite direction is taking place.

2. In a machine of the class described, in combination, feeding means for a web of fabric, revoluble power-devices, and shifting mechanism for said feeding means, the said shifting mechanism being manually-operable and adapted to be manually thrown into connection with either of said power devices selectively, to effect a shift in the feeding means by power in either of two directions.

3. In a machine of the class described in combination a device for feeding from a roll a web of fabric, a support for said roll and means for its manual adjustment transversely of the direction of feeding, oppositely faced driving disks, a driving member adapted to be manually thrown into contact with said disks alternatively, a shaft to which said member is attached, a second shaft adapted to be rotated in one or the other direction by said first mentioned shaft according to the connection of the latter with one or the other of said disks, said second shaft being adapted to move said support for said roll to adjust said roll transversely of the direction of feed.

4. In a machine of the class described, a driving shaft, a sleeve splined to said shaft, oppositely faced friction disks fixed to said sleeve, means for shifting said sleeve and disks longitudinally on said shaft, a friction cone adapted to engage with either of said disks according to the position of the latter, a longitudinal shaft to which said cone is fixed, a transverse screw shaft adapted for manual operation, intermeshing bevel gears on said shafts, a transversely movable support in screw threaded engagement with said screw shaft, and means on said support for receiving a roll of fabric, the whole adapted to utilize the manual operation of said screw shaft or the rotary movement of said driving shaft controllably to shift said carrier and its roll of fabric transversely of the machine.

5. In a machine of the class described, means for feeding a web of fabric including a spool receiving shaft and a fabric guide roll, mechanism for bodily shifting the said shaft and guide roll in unison comprising a screw shaft, two driving members and a driving connection for said screw shaft, said driving connection being manually controllable for engagement with said driving members alternately to effect a rotation of said screw shaft in opposite directions.

In testimony whereof, I have hereunto set my hand in the presence of two subscribing witnesses.

THOMAS MIDGLEY.

Witnesses:
 JOHN CARLSON,
 J. H. SWIFT.